Figures 1, 2, 3:
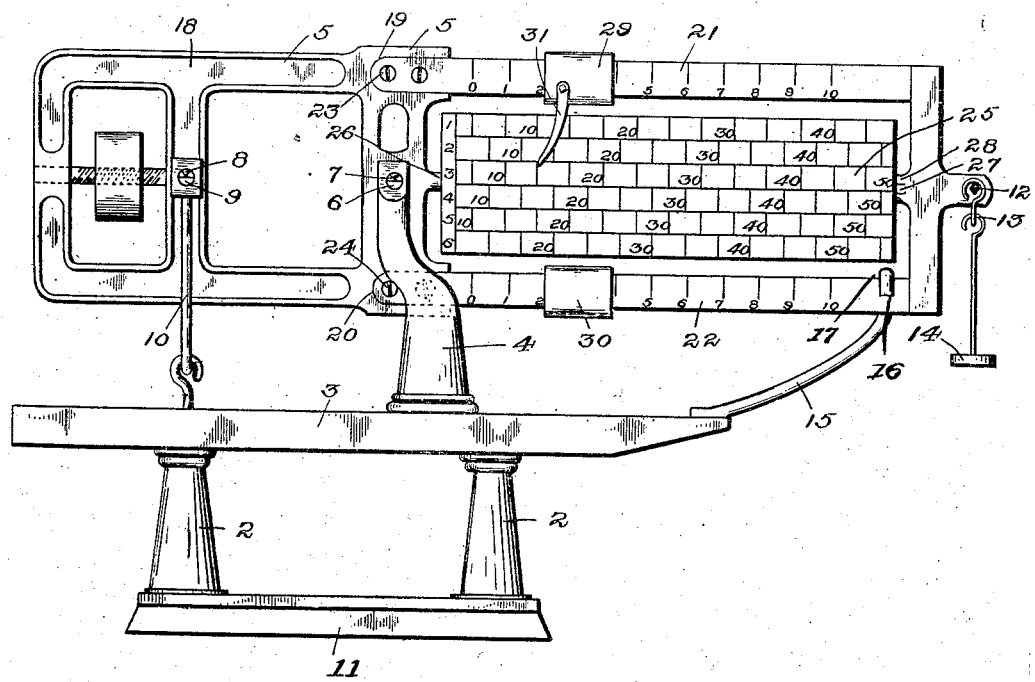

No. 892,690. PATENTED JULY 7, 1908.
A. SCRIVENOR.
SCALE BEAM.
APPLICATION FILED SEPT. 30, 1907.

Witnesses
Inventor
Arthur Scrivenor
By Stewart & Stewart
Attorney

UNITED STATES PATENT OFFICE.

ARTHUR SCRIVENOR, OF RICHMOND, VIRGINIA.

SCALE-BEAM.

No. 892,690.  Specification of Letters Patent.  Patented July 7, 1908.

Application filed September 30, 1907. Serial No. 395,179.

*To all whom it may concern:*

Be it known that I, ARTHUR SCRIVENOR, a citizen of the United States of America, residing at the city of Richmond, in the county of Henrico and State of Virginia, have invented certain new and useful Improvements in Scale-Beams, of which the following is a specification.

The present invention relates to scales, and more particularly to that type of scale having a horizontally extending beam which is supported at a point intermediate of its extremities on a knife edge or other pivotal bearing by which the beam is divided into two arms. Scales of this type are provided with a commodity-receiving platform or a scale pan and a counterpoise. The platform or pan is supported by a knife edge resting on a suitable bearing surface carried by one arm of the beam, while the counterpoise is divided into a plurality of weights, one of which is of variable quantity and suspended from the other arm by a knife edge bearing, while another weight is mounted on a graduated slide forming part of the arm and made adjustable along the slide to register with the different graduations. There may be more than one graduated slide with a weight for each slide.

Scale beams in different makes of scales are variously constructed, some being made of a single piece of wrought iron or steel, while others are cast. The scale beams of the former type are expensive, because of the difficulty of making and forging the irregular pattern desired. The solid cast iron beams are difficult of production, because the hardness of the external surface of such castings offers great resistance to the engraving of the graduations on the slide. Many scale beams are made with a cast iron body and a slide or slides of softer material attached to the body portion. A scale beam in order to be adapted to weighing accurately must be finely adjusted. Such adjustment cannot be maintained unless the beam is absolutely rigid. To make such a beam remain rigid under a continuous strain of a number of parts, some of which are of soft material, has in the past offered an obstacle to the production of a perfect scale. To overcome this difficulty is the object of the present invention.

Referring to the accompanying drawings—
Figure 1 is a side elevation of a scale of the type described. Figs. 2 and 3 are detail views showing the method of attaching the slides to the body of the beam.

A base (1) is provided with upright pillars (2), on which is mounted a horizontal member (3), having a bearing support (4), on which the scale beam (5) is pivotally mounted. In the device herein shown, the bearing support (4) is provided with a bearing block (6), of resistive material, on which rests a knife edge (7) rigidly connected to the scale beam (5). The beam is provided on one side of the fulcrum with a knife edge (8), which is engaged by the block (9), which supports a U-shaped member (10), connected by means of a series of rods and levers not shown with a platform (11), to the end that any commodity placed on the platform communicates to the loop (10) a downward stress proportional to its weight. On the opposite side of the fulcrum (7) the scale-beam is provided with an upwardly disposed knife edge (12), engaging a coöperating downwardly disposed bearing surface carried by a hook (13), from which is suspended a weight (14), the quantity of which weight may be varied to suit the operator. A bracket (15) extends upward and to the right in Fig. 1 from the horizontal member (3) of the frame, and is provided at its extremity with a hook (16) and a bearing surface (17) by which the swing of the beam is limited. The scale beam (5) is composed of a cast body portion (18), forming one arm. This body carries the knife edges (7) upon which the beam is supported and a bearing block (8), upon which the commodity to be weighed rests. This body portion is recessed at 19 and 20 (see particularly Figs. 2 and 3) to receive the graduated slide members 21 and 22 forming the other arm of the beam. The latter are formed to fit the slots exactly, so that they have no play whatever, and are secured therein by means of screws 23 and 24, which pass through the slide members and engage the castings, forming a joint which is absolutely and permanently rigid in a vertical plane transverse to the knife edges.

It will be observed that the rigidity of the beam in the plane specified is not dependent upon the placing of the screws 23 and 24, but upon the accuracy with which the slide members are formed to fit the slots.

In the scale shown, a cylinder (25) is rotatably mounted on the beam having a pivot

(26) engaging a bearing in the body portion of the beam, and a pivot (27) which is secured in an arm (28), which engages one of the sliding members at each of its extremities. The cylinder is marked with longitudinally extending lines equally spaced on its circumference, each line being numbered to indicate a certain price of commodity to be weighed. The lines are divided longitudinally into spaces which correspond to the weight of the commodity which will be sold at a given price. In this case the graduations correspond to a difference of ten cents, these spaces being divided into tenths.

The upper and lower slide members are graduated into units of weight, and each is provided with a weight adapted to be adjusted along its slide. Either one of these weights (29 and 30), may be used as a tare weight, though commonly the lower one is so employed and the upper is provided with a pointer (31), by which the price of the quantity of commodity weighed is indicated, the cylinder being revolved until the line of graduations on its surface corresponding to the price of the commodity to be weighed is in registration with the pointer.

Having thus described my invention, what I claim and desire to secure by Letters Patent is:

1. A scale beam, consisting of a cast metal arm and an arm composed of less resistive material, the former being slotted horizontally to receive the latter to form a rigid structure.

2. In a scale, a beam, a bearing supporting said beam intermediately and dividing it into two arms, one of said arms being cast in a single piece and slotted horizontally to receive the other arm and hold it in rigid engagement.

3. A scale beam, consisting of a cast iron frame forming one arm and a slide marked with graduations in units of weight forming the other arm, the frame being slotted to receive an extremity of the slide, the slide and frame forming a structure which is rigid in a vertical plane and a bearing near the juncture of the arms upon which the beam is pivoted.

4. In a scale, a beam composed of a cast iron frame forming one arm and a slide marked with graduations in units of weight forming the other arm, a bearing upon which the beam is supported at the point near the juncture of the arms, a bearing on the frame from which commodity to be weighed is supported and a counterpoise on the slide adapted to register with the graduations, the frame being slotted to receive one extremity of the slide, forming with it a structure which is rigid in a vertical plane.

5. In a scale, a beam composed of an integral cast iron frame forming one arm and slides marked with graduations forming the other arm, a bearing upon which the beam is supported intermediately at a point near the juncture of the arms, a bearing on the frame from which commodity to be weighed is supported, and a counterpoise mounted on each slide to register with the graduations, the frame being slotted to receive an extremity of each slide, forming a structure rigid in a vertical plane.

6. In a scale, a beam composed of an integral cast iron frame and a slide marked with graduations, a bearing upon which the beam is supported intermediately, a bearing on the frame from which commodity to be weighed is supported, and a counterpoise mounted on the slide to register with the graduations, the frame being slotted to receive an extremity of the slide, forming a structure rigid in a vertical plane, a cylinder graduated in units of price, and a pointer on one counterpoise adapted to indicate the price of the commodity weighed.

Signed by me at Richmond, Va. this 21st day of September, 1907.

ARTHUR SCRIVENOR.

Witnesses:
 FRED S. KITCHEN,
 J. STUART REYNOLDS.